Oct. 12, 1948. H. ST. PIERRE 2,451,255

CHAIN LINK AND METHOD OF MAKING SAME

Filed May 7, 1945

INVENTOR
Henry St. Pierre
by attorney
Charles R. Fay

Patented Oct. 12, 1948

2,451,255

UNITED STATES PATENT OFFICE 2,451,255

CHAIN LINK AND METHOD OF MAKING SAME

Henry St. Pierre, Worcester, Mass.

Application May 7, 1945, Serial No. 592,303

3 Claims. (Cl. 59—35)

This invention relates to new and improved methods for making chain links and to a new and improved chain link having grain characteristics improving the quality and strength of the chain.

Objects of the invention include the provision of a method of making chain links by rolling a length of steel, with longitudinal grain, between rollers embossed to form raised link blanks on the steel, the blanks being positioned transversely of the length of steel and parallel to each other, so that the grain extends transversely of the blanks, i. e. parallel to and through the end positions thereof, and then hot forging the blanks in dies to the final link form desired and separating the links from the steel to the end that the process of making all forged steel chain links is not only reduced in cost but the links are made stronger at the critical points, i. e. the ends, since the grain generally follows the contour of the link ends, and all strains are normal to the grain flow at the ends where the tension is exerted, resulting in reduced fractures.

Other objects and advantages will appear hereinafter.

Figure 1:
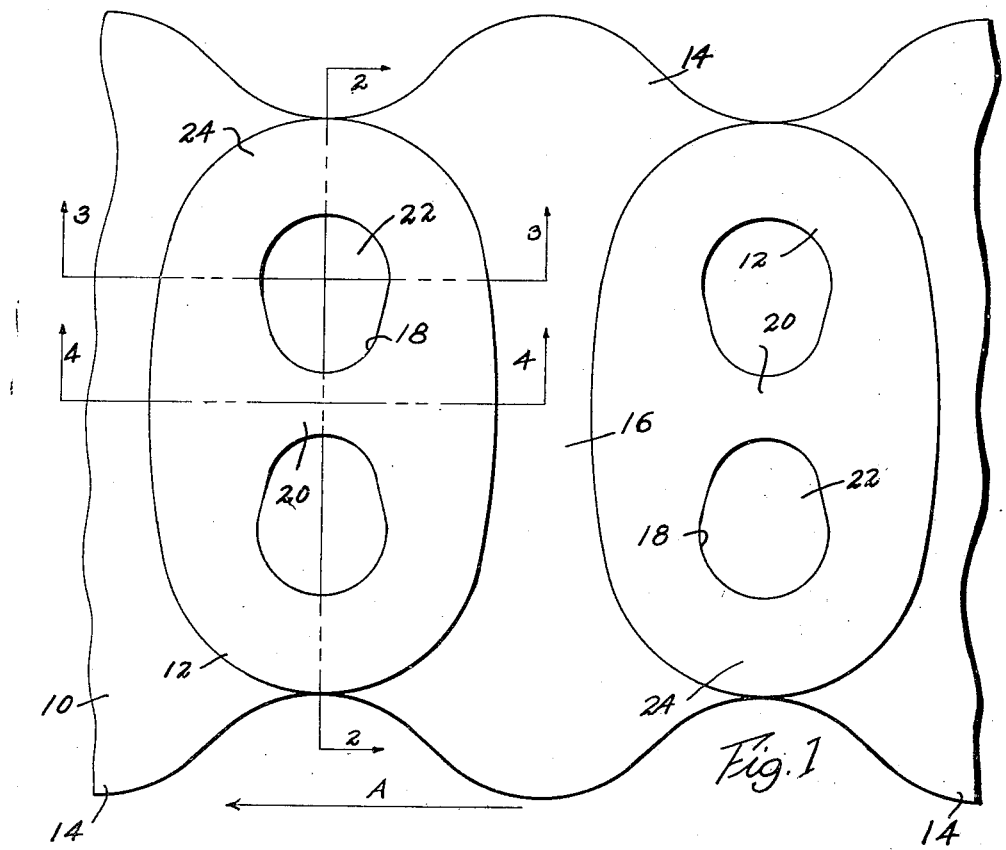
Fig. 1 is a plan view of a part of a length of steel after embossing.
Figure 2:
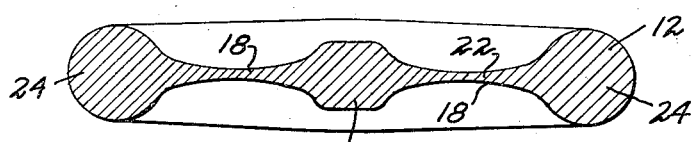
Fig. 2 is a section on line 2—2 of Fig. 1.
Figure 4:
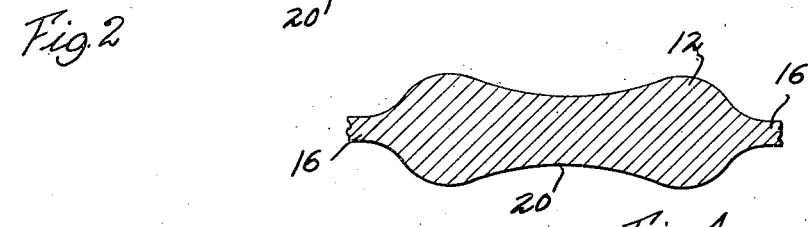
Fig. 4 is a section on line 4—4 of Fig. 1.
Figure 3:
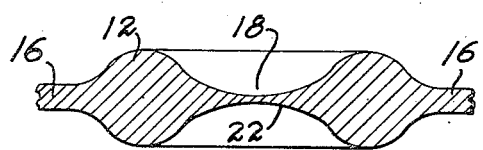
Fig. 3 is a section on line 3—3 of Fig. 1.

Fig 1 illustrates the first step in the process. A long bar or rod is embossed as for instance by impressed rollers by passing the bar or rod longitudinally thru the rollers in the manner of reduction in a rolling mill. The bar or rod 10 is run thru the rollers in the direction of arrow A and the link blanks 12 are formed with their major axes transverse to the length of the steel as it progresses thru the rollers. As the steel is embossed, it flows outwardly between the blanks 12 as at 14 due to the reduction in thickness between the blanks at 16.

The particular links illustrated are stud links having eyes impressed at 18 forming studs 20, but the eyes are not cut out, and a thickness remains at 22 to be later removed to complete the links. However, links without studs could be made by this process equally as well.

The grain of the rod or bar is of course parallel to the length thereof due to the previous conventional rolling, and the embossing step does not affect the grain except to a slight extent. Hence the grain extends generally parallel to the small end portions 24 of the blanks, i. e. transverse to the major axes of the links.

This result is extremely beneficial to the strength characteristics of the finished links and chain made therefrom, as the strain on the chain is carried at the ends in toto, whereas at all other points in the links the branches thereof take but one-half the load. With the grain generally parallel to the end contour, the individual links are not as liable to separate or fracture at the ends as with the grain running out the ends as heretofore, because fractures tend to follow the grain. The present method is less expensive than the old method of drop forging each link from bar or rod stock, both because it is faster and more continuous.

After embossing in the manner described, the long lengths of embossed steel are fed continuously to a set of finish dies in a drop hammer, or the steel may be cut between blanks to separate the same for the finish blow and trimming operation. In any case, hot forging must be practiced to finish the links to desired form, and therefore the links have the strength characteristics and grain formation of forged links.

When the links have been made as above described, they may be used as solid links, or they may be separated to form joiner links, receiving the solid links, a solid link in each eye. Then the separated links may be welded, and restruck to the final form desired, to refine the welding metal and to shape the link. Thereafter the thus assembled chain may be heat treated and normalized to the degree desired.

Among the unobvious advantages obtained by the combined rolling and forging steps there is a compression or squeezing action at the ends of the links so that the grain flow lines are slightly closer together in the ends than elsewhere in the links, because the link ends are close to the edges of the bar. This strengthens the links where the strength is needed the most, i. e. at the ends.

Having thus described my invention, I do not wish to be limited to the disclosure herein, but what I claim is:

1. Process of making chain links of generally ellipsoidal form by embossing a series of link blanks in a length of steel in a manner to position the blanks generally transverse of the rolled length of steel, so that the grain of the steel will be transverse of the blanks, hot forging each blank to final link form, and separating.

2. Method of making chain links by rolling a length of steel and raising blanks thereon in the form of links, the latter lying transversely of the extruded steel length and the grain of the latter lying transversely of the blanks, hot forging the separate blanks and separating the same from the length of steel.

3. Method of making chain links by rolling a steel blank to link form, with the grain of the steel extending across the longitudinal axis of the link, and hot forging the link blank.

HENRY ST. PIERRE.

REFERENCES CITED

The following references are of record in the file of this patent:

UNITED STATES PATENTS

| Number | Name | Date |
| --- | --- | --- |
| 1,670,758 | Witherow | May 22, 1928 |